(12) United States Patent
Bowman et al.

(10) Patent No.: US 8,300,984 B2
(45) Date of Patent: *Oct. 30, 2012

(54) REAL-TIME SPHERICAL CORRECTION OF MAP DATA

(75) Inventors: Gordon Gregory Bowman, Kemptville (CA); Gerhard Dietrich Klassen, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/974,546

(22) Filed: Dec. 21, 2010

(65) Prior Publication Data

US 2011/0093197 A1    Apr. 21, 2011

Related U.S. Application Data

(63) Continuation of application No. 11/627,554, filed on Jan. 26, 2007, now Pat. No. 7,881,562.

(51) Int. Cl.
G06K 9/32 (2006.01)
G06T 15/00 (2011.01)
G09G 5/00 (2006.01)
H04N 9/74 (2006.01)
G06F 7/38 (2006.01)

(52) U.S. Cl. ........ 382/293; 345/419; 345/619; 348/578; 708/442

(58) Field of Classification Search ................ None
See application file for complete search history.

(56) References Cited

OTHER PUBLICATIONS

Snyder "Map Projection—A Woring Manual", 1987, United States Government Printing Office, pp. 20-28.*
U.S. Appl. No. 11/627,554.
U.S. Appl. No. 11/624,554

* cited by examiner

*Primary Examiner* — Anand Bhatnagar
*Assistant Examiner* — Randolph Chu
(74) *Attorney, Agent, or Firm* — Gowling Lafleur Henderson LLP

(57) ABSTRACT

A method of displaying a map on a wireless communications device includes steps of obtaining map data for rendering the map to be displayed on the wireless communications device, generating corrected map data by applying a spherical correction factor to the obtained map data, and rendering the corrected map data to display the map on a display of the wireless communications device. The spherical correction factor corrects for map distortions that occur at northerly (or southerly) latitudes. Since the spherical correction factor is a simple correction to a 3×3 transformation matrix, this spherical correction can be easily applied without taxing the CPU limitations of small handheld devices.

14 Claims, 8 Drawing Sheets

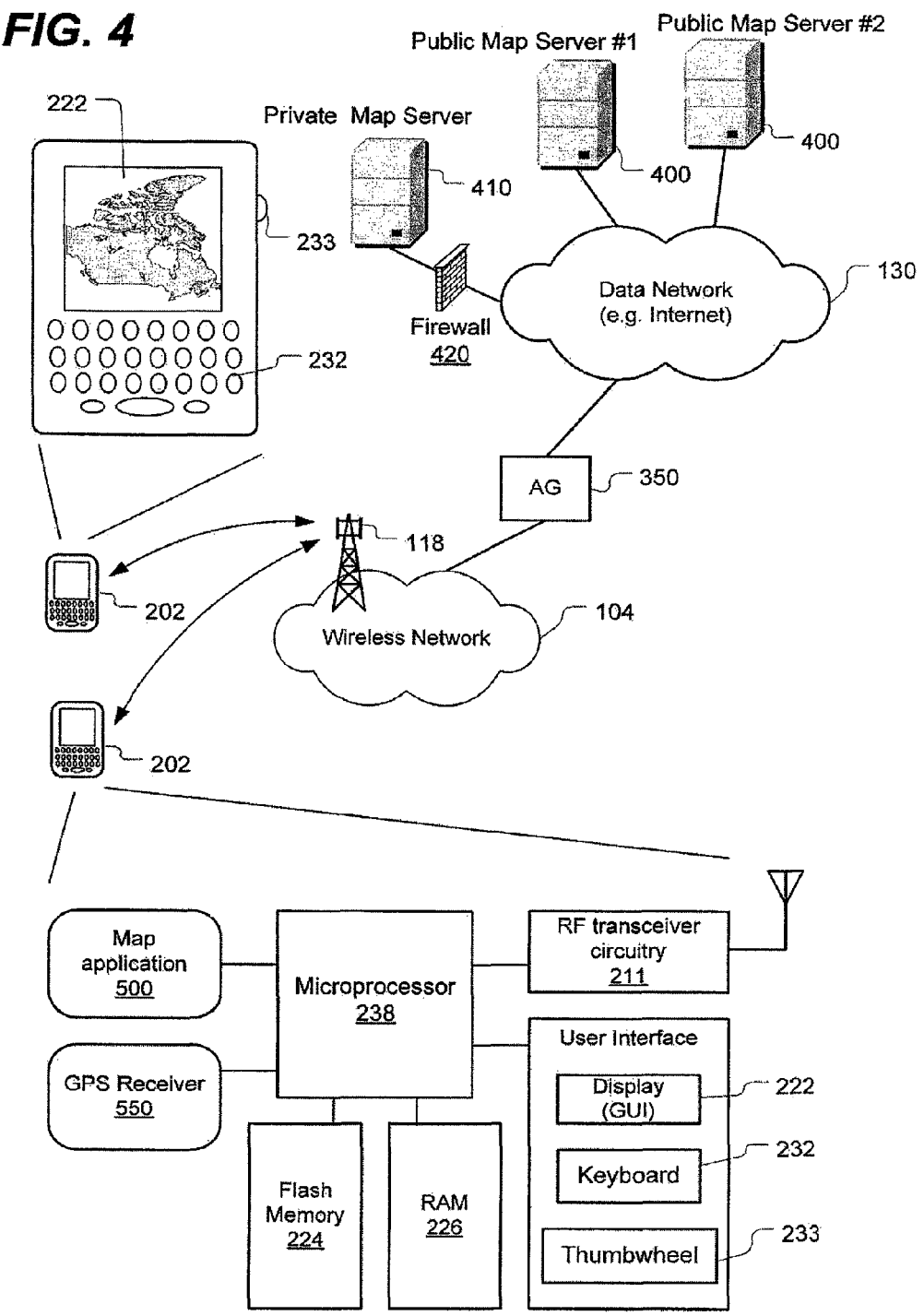

Without spherical correction:

With spherical correction:

REAL-TIME SPHERICAL CORRECTION OF MAP DATA

CROSS-REFERENCE TO RELATED APPLICATIONS

This application is a continuation of U.S. patent application Ser. No. 11/627,554 which claims priority from U.S. Provisional Patent Application No. 60/788,434 entitled "Methods and Apparatus for Dynamically Labelling Map Objects in Visually Displayed Maps of Mobile Communication Devices" filed on Mar. 31, 2006 and from U.S. Provisional Patent Application No. 60/787,541 entitled "Method and System for Distribution of Map Content to Mobile Communication Devices" filed on Mar. 31, 2006.

TECHNICAL FIELD

The present disclosure relates generally to wireless communications devices and, in particular, to techniques for generating map content on wireless communications devices.

BACKGROUND

Wireless communications devices such as the BlackBerry® by Research in Motion Limited enable users to download map content from web-based data sources such as BlackBerry Maps™, Google Maps™ or Mapquest™. Downloaded map content is displayed on a small LCD display screen of the wireless communications device for viewing by the user. The user can pan up and down and side to side as well as zoom in or out. With the increasing availability of wireless communications devices having onboard Global Positioning System (GPS) receivers for providing location-based services (LBS), the efficient delivery and handling of map data is increasingly important.

When raw map data (i.e. "real" coordinates of latitude and longitude for all vertices of geographical features) are received at the wireless device, the map data corresponding to naturally curved geographical features has to be projected onto a display, which is a planar surface. Map projections, like Mercator, attempt to correct for the exaggerated characteristics brought about by equal degrees of latitude and longitude being rendered as though they both represent equal distances in both the x- and y-directions (a condition that is only true at the equator). In reality, the further from the equator you go, the smaller the distance between degrees of longitude become, while the distance between degrees of latitude stay the same. Geographic features thus get stretched horizontally more and more as you move away from the equator. For example, while purely east-west roads are not distorted, those with both a north-south component and an east-west component can appear distorted. For example, in the northerly (or southerly) latitudes, roads that are in fact perpendicular may appear to intersect at an angle.

Mercator projection can be used to correct for this distortion by essentially making the lines of latitude get closer together the further you get from the equator by exactly the same amount that the lines of longitude get closer together. This is known as a conformal projection, one in which the x- and y-scales are always the same. But a real projection like this involves correcting every one of its vertices individually using its "own" latitude coordinate, which is too computationally intensive to do in real-time on a small handheld device. In other words, these computationally intensive map-projection algorithms are generally unsuitable for use on small wireless handheld devices because of the limited onboard processing capacity of these devices. Accordingly, a technique for efficiently compensating for map projection distortions on wireless communications devices thus remains highly desirable.

BRIEF DESCRIPTION OF THE DRAWINGS

Further features and advantages of the present technology will become apparent from the following detailed description, taken in combination with the appended drawings, in which:

FIG. 4 is a schematic depiction of a wireless network having an applications gateway for optimizing the downloading of map data from map servers to wireless communications devices;

It will be noted that throughout the appended drawings, like features are identified by like reference numerals.

DETAILED DESCRIPTION OF THE EMBODIMENTS

The present technology provides, in general, a method for efficiently displaying a map on a display screen of a wireless communications device that corrects for distortions that occur at high northerly (or southerly) latitudes. The distortions are corrected by applying a simple spherical correction factor, calculated using the cosine of the absolute value of the latitude of the center of the visible region of the map, to each of the vertices of the visible region of the map. Beyond a predetermined zoom level, a fixed spherical correction factor is applied.

Thus, an aspect of the present technology is a method of displaying a map on a wireless communications device that includes steps of obtaining map data for rendering the map to be displayed on the wireless communications device, generating corrected map data by applying a spherical correction factor to the obtained map data, and rendering the corrected map data to display the map on a display of the wireless communications device.

Another aspect of the present technology is a computer program product that includes code adapted to perform the steps of the foregoing method when the computer program product is loaded into memory and executed on a processor of a wireless communications device.

Yet another aspect of the present technology is a wireless communications device for enabling a user of the device to display a map on the device. The wireless device includes an input device for enabling the user to cause the device to obtain map data for rendering the map to be displayed on a display of the device and a processor for generating corrected map data by applying a spherical correction factor to the obtained map data and for rendering the corrected map data to display the map on the display of the wireless communications device.

The details and particulars of these aspects of the technology will now be described below, by way of example, with reference to the attached drawings.

Figure 1:
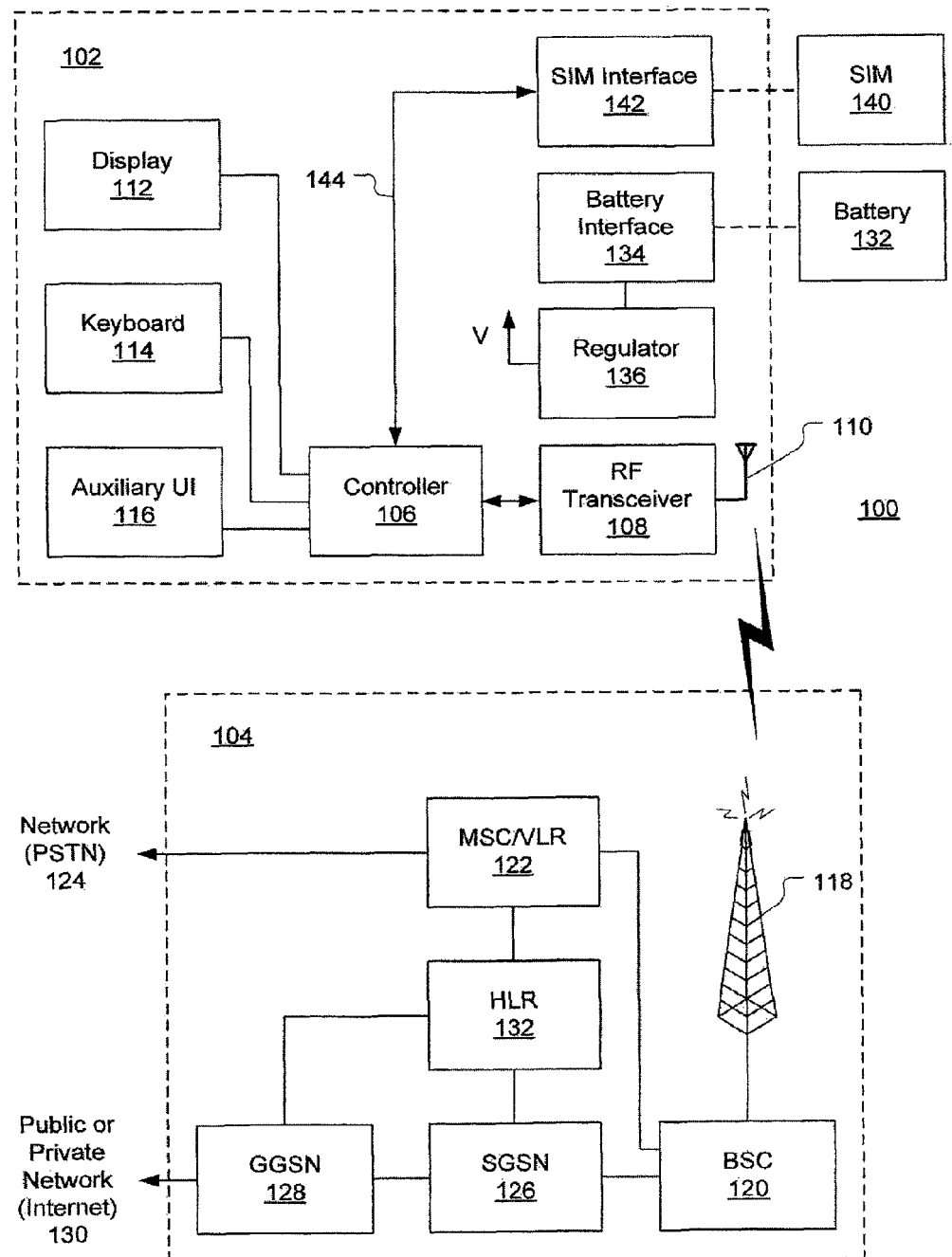
FIG. 1 is a block diagram schematically illustrating pertinent components of a wireless communications device and of a wireless communications network.

FIG. 1 is a block diagram of a communication system 100 which includes a wireless communications device 102 (also referred to as a mobile communications device) which communications through a wireless communication network 104. For the purposes of the present specification, the expression "wireless communications device" encompasses not only a wireless handheld, cell phone or wireless-enabled laptop but also any mobile communications device or portable communications device such as a satellite phone, wireless-enabled PDA or wireless-enabled MP3 player. In other words, for the purposes of this specification, "wireless" shall be understood as encompassing not only standard cellular or microwave RF technologies, but also any other communications technique that conveys data over the air using an electromagnetic signal.

The wireless communications device 102 preferably includes a visual display 112, e.g. an LCD screen, a keyboard 114 (or keypad), and optionally one or more auxiliary user interfaces (UI) 116, each of which is coupled to a controller 106. The controller 106 is also coupled to radio frequency (RF) transceiver circuitry 108 and an antenna 110. Typically, controller 106 is embodied as a central processing unit (CPU) which runs operating system software in a memory device (described later with reference to FIG. 2). Controller 106 normally controls the overall operation of the wireless communications device 102, whereas signal processing operations associated with communications functions are typically performed in the RF transceiver circuitry 108. Controller 106 interfaces with the display screen 112 to display received information, stored information, user inputs, and the like. Keyboard/keypad 114, which may be a telephone-type keypad or a full QWERTY keyboard, is normally provided for entering commands and data.

The wireless communications device 102 sends communication signals to and receives communication signals from network 104 over a wireless link via antenna 110. RF transceiver circuitry 108 performs functions similar to those of station 118 and Base Station Controller (BSC) 120, including, for example, modulation and demodulation, encoding and decoding, and encryption and decryption. It will be apparent to those skilled in the art that the RF transceiver circuitry 108 will be adapted to the particular wireless network or networks in which the wireless communications device is intended to operate.

The wireless communications device 102 includes a battery interface 134 for receiving one or more rechargeable batteries 132. Battery 132 provides electrical power to electrical circuitry in the device 102, and battery interface 134 provides for a mechanical and electrical connection for battery 132. Battery interface 134 is couple to a regulator 136 which regulates power to the device. When the wireless device 102 is fully operationally, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Wireless communications device 102 operates using a Subscriber Identity Module (SIM) 140 which is connected to or inserted in the wireless communications device 102 at a SIM interface 142. SIM 140 is one type of a conventional "smart card" used to identify an end user (or subscriber) of wireless device 102 and to personalize the device, among other things. Without SIM 140, the wireless communications device 102 is not fully operational for communication through wireless network 104. By inserting the SIM card 140 into the wireless communications device 102, an end user can have access to any and all of his subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical wireless device. SIM 140 may store additional user information for the wireless device as well, including datebook (calendar) information and recent call information.

The wireless communications device 102 may consist of a single unit, such as a data communication device, a cellular telephone, a Global Positioning System (GPS) unit, a multiple-function communication device with data and voice communication capabilities, a wireless-enabled personal digital assistant (PDA), or a wireless-enabled laptop computer. Alternatively, the wireless communications device 102 may be a multiple-module unit comprising a plurality of separate components, including but in no way limited to a computer or other device connected to a wireless modem. In particular, for example, in the block diagram of FIG. 1, RF circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU.

The wireless communications device 102 communicates in and through a wireless communication network 104. The wireless communication network may be a cellular telecommunications network. In the example presented in FIG. 1, wireless network 104 is configured in accordance with Global Systems for Mobile communications (GSM) and General Packet Radio Service (GPRS) technologies. Although wireless communication network 104 is described herein as a GSM/GPRS-type network, any suitable network technologies may be utilized such as Code Division Multiple Access (CDMA), Wideband CDMA (WCDMA), whether 2G, 3G, or Universal Mobile Telecommunication System (UMTS) based technologies. In this example, the GSM/GPRS wireless network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is, in turn, coupled to a public or private data network 130 (such as the Internet). HLR 132 is coupled to MSC 122, SGSN 126 and GGSN 128.

Tower station 118 is a fixed transceiver station. Tower station 118 and BSC 120 may be referred to as transceiver equipment. The transceiver equipment provides wireless network coverage for a particular coverage area commonly referred to as a "cell". The transceiver equipment transmits communication signals to and receives communication signals from wireless communications devices 102 within its cell via station 118. The transceiver equipment normally performs such functions as modulation and possibly encoding and/or encryption of signals to be transmitted to the wireless communications device in accordance with particular, usually predetermined, communication protocols and parameters. The transceiver equipment similar demodulates and possibly decodes and decrypts, if necessary, any communication signals received from the wireless communications device 102 transmitting within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and wireless communications device 102. An RF channel is a limited resource that must be conserved, typically due limits in overall bandwidth and a limited battery power of the wireless device 102. Those skilled in the art will appreciate that a wireless network in actual practice may include hundreds of cells, each served by a station 118, depending upon desired overall expanse of network coverage. All pertinent components may be connected by multiple switches and routers (not shown), controlled by multiple network controllers.

For all wireless communications devices 102 registered with a network operator, permanent data (such as the user profile associated with each device) as well as temporary data (such as the current location of the device) are stored in the HLR 132. In case of a voice call to the wireless device 102, the HLR 132 is queried to determine the current location of the device 102. A Visitor Location Register (VLR) of MSC 122 is responsible for a group of location areas and stores the data of those wireless devices that are currently in its area of responsibility. This includes parts of the permanent data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of wireless devices 102. SGSN 126 also performs security functions and access control. Gateway GPRS Support Node (GGSN) 128 provides internetworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by wireless device 102 or by the transceiver equipment instructing the wireless device to select a particular cell. The wireless device 102 informs wireless network 104 when it reselects another cell or group of cells, known as a routing area.

In order to access GPRS services, the wireless device 102 first makes its presence known to wireless network 104 by performing what is known as a GPRS "attach". This operation establishes a logical link between the wireless device 102 and SGSN 126 and makes the wireless device 102 available to receive, for example, pages via SGSN, notifications of incoming GPRS data, or SMS messages over GPRS. In order to send and receive GPRS data, the wireless device 102 assists in activating the packet data address that it wants to use. This operation makes the wireless device 102 known to GGSN 128; internetworking with external data networks can thereafter commence. User data may be transferred transparently between the wireless device 102 and the external data networks using, for example, encapsulation and tunnelling. Data packets are equipped with GPRS-specific protocol information and transferred between wireless device 102 and GGSN 128.

Those skilled in the art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
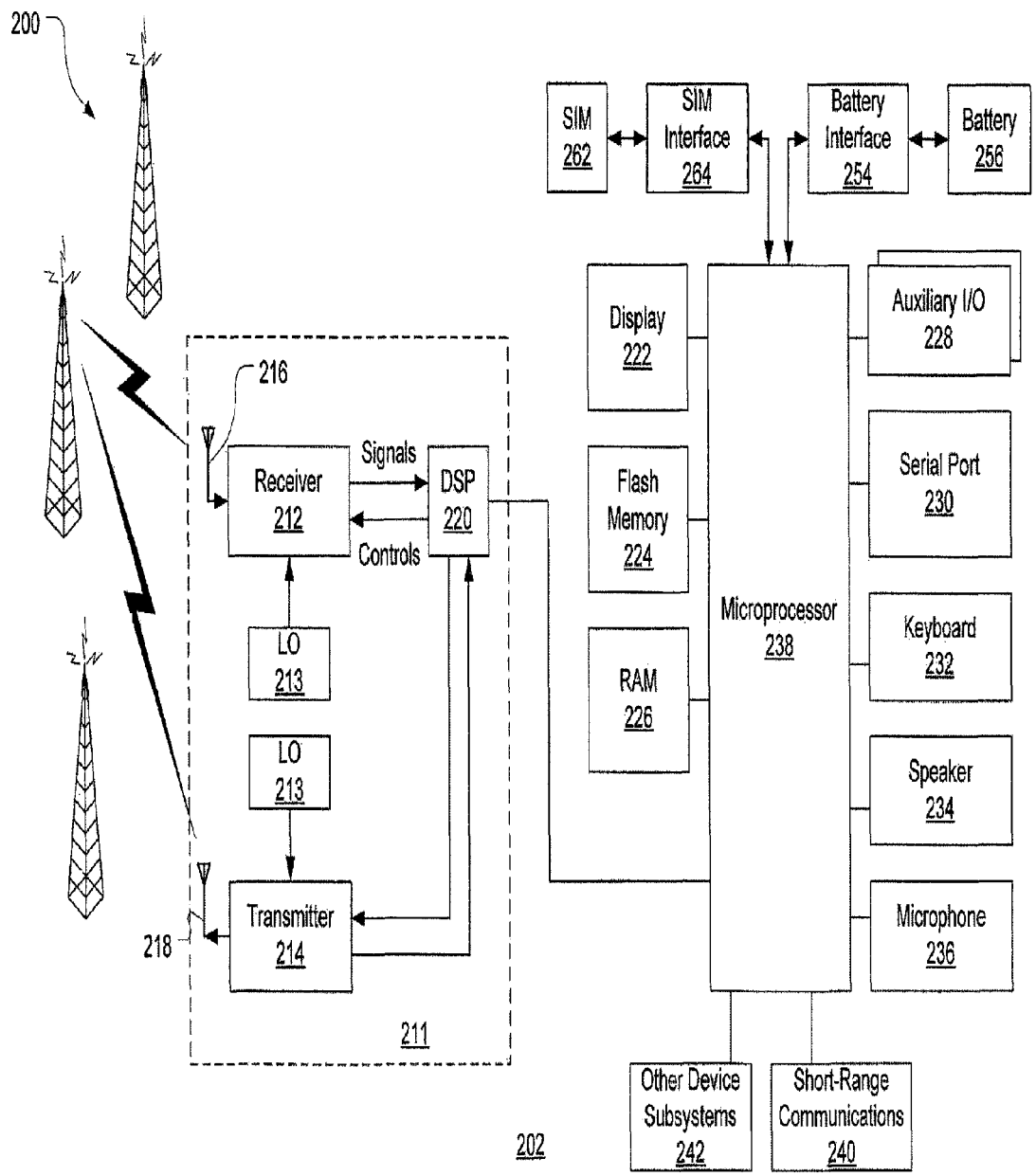
FIG. 2 is a more detailed block diagram of a wireless communications device.

FIG. 2 is a detailed block diagram of a preferred wireless communications device 202. The wireless device 202 is preferably a two-way communication device having at least voice and advanced data communication capabilities, including the capability to communicate with other computer systems. Depending on the functionality provided by the wireless device 202, it may be referred to as a data messaging device, a two-way pager, a cellular telephone with data message capabilities, a wireless Internet appliance, or a data communications device (with or without telephony capabilities). The wireless device 202 may communicate with any one of a plurality of fixed transceiver stations 200 within its geographic coverage area.

The wireless communications device 202 will normally incorporate a communication subsystem 211, which includes a receiver 212, a transmitter 214, and associated components, such as one or more (preferably embedded or internal) antenna elements 216 and 218, local oscillators (LO's) 213, and a processing module such as a digital signal processor (DSP) 220. Communication subsystem 211 is analogous to RF transceiver circuitry 108 and antenna 110 shown in FIG. 1. As will be apparent to those skilled in the field of communications, the particular design of communication subsystem 211 depends on the communication network in which the wireless device 202 is intended to operate.

The wireless device 202 may send and receive communication signals over the network after required network registration or activation procedures have been completed. Signals received by antenna 216 through the network are input to receiver 212, which may perform common receiver functions as signal amplification, frequency down conversion, filtering, channel selection, and the like, and, as shown in the example of FIG. 2, analog-to-digital (A/D) conversion. A/D conversion of a received signal allows more complex communication functions such as demodulation and decoding to performed in the DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in the DSP 220.

Network access is associated with a subscriber or user of the wireless device 202, and therefore the wireless device requires a Subscriber Identity Module or SIM card 262 to be inserted in a SIM interface 264 in order to operate in the network. SIM 262 includes those features described in relation to FIG. 1. Wireless device 202 is a battery-powered device so it also includes a battery interface 254 for receiving one or more rechargeable batteries 256. Such a battery 256 provides electrical power to most if not all electrical circuitry in the device 102, and battery interface provides for a mechanical and electrical connection for it. The battery interface 254 is coupled to a regulator (not shown) which provides a regulated voltage V to all of the circuitry.

Wireless communications device 202 includes a microprocessor 238 (which is one implementation of controller 106 of FIG. 1) which controls overall operation of wireless device 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-board functions. Notably, some subsystems, such as keyboard 232 and display 222, for example, may be used for both communication-related functions, such as entering a text message for transmission over a communication network, and device-resident functions such as a calculator or task list. Operating system software used by the microprocessor 238 is preferably stored in a persistent (non-volatile) store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, enables execution of software applications on the wireless device 202. A predetermined set of applications which control basic device operations, including at least data and voice communication applications, will normally be installed on the device 202 during its manufacture. For example, the device may be pre-loaded with a personal information manager (PIM) having the ability to organize and manage data items relating to the user's profile, such as e-mail, calendar events, voice mails, appointments, and task items. Naturally, one or more memory stores are available on the device 202 and SIM 256 to facilitate storage of PIM data items and other information.

The PIM application preferably has the ability to send and receive data items via the wireless network. PIM data items may be seamlessly integrated, synchronized, and updated via the wireless network, with the wireless device user's corresponding data items stored and/or associated with a host computer system thereby creating a mirrored host computer on the wireless device 202 with respect to such items. This is especially advantageous where the host computer system is the wireless device user's office computer system. Additional applications may also be loaded into the memory store(s) of the wireless communications device 202 through the wireless network, the auxiliary I/O subsystem 228, the serial port 230, short-range communications subsystem 240, or any other suitable subsystem 242, and installed by a user in RAM 226 or preferably a non-volatile store (not shown) for execution by the microprocessor 238. Such flexibility in application installation increases the functionality of the wireless device 202 and may provide enhanced onboard functions, communication-related functions or both. For example, secure communication applications may enable electronic commerce functions and other such financial transactions to be performed using the wireless device 202.

In a data communication mode, a received signal such as a text message, an e-mail message, or a web page download will be processed by communication subsystem 211 and input to microprocessor 238. Microprocessor 238 will preferably further process the signal for output to display 222 or alternatively to auxiliary I/O device 228. A user of the wireless device 202 may also compose data items, such as email messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of the wireless communications device 202 is substantially similar, except that the received signals would be output to speaker 234 and signals for transmission would be generated by microphone 236. Alternative voice or audio I/O subsystems, such as a voice message recording subsystem, may also be implemented on the wireless device 202. Although voice or audio signal output is preferably accomplished primarily through speaker 234, display 222 may also be used to provide an indication of the identity of the calling party, duration on a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of wireless device 202 by providing for information or software downloads to the wireless device 202 other than through the wireless network. The alternate download path may, for example, be used to load an encryption key onto the wireless device 202 through a direct and thus reliable and trusted connection to thereby provide secure device communications.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a trademark of Bluetooth SIG, Inc.

Figure 3A:
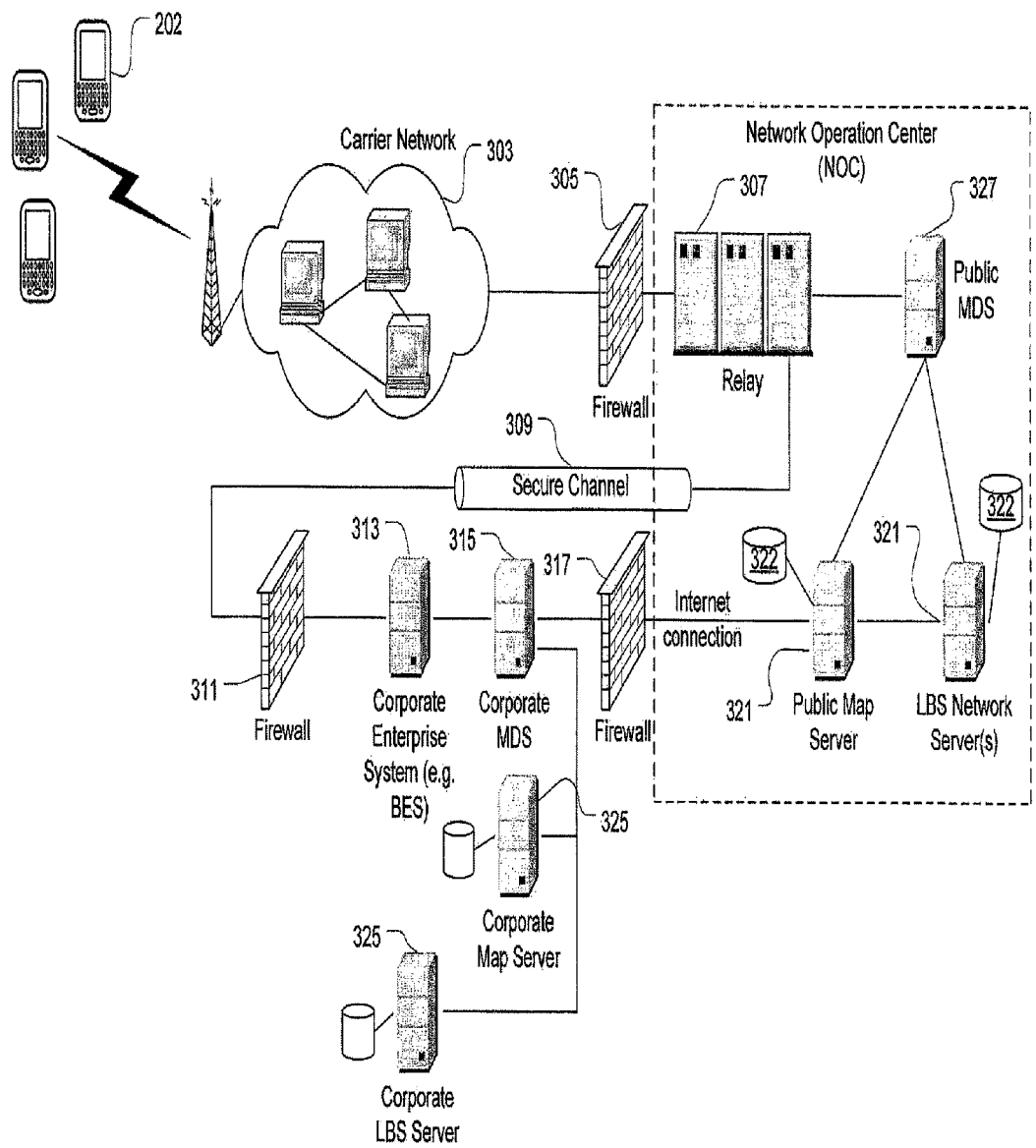
FIG. 3A is a system diagram of network components which provide mapping functionality in the wireless communications devices of FIG. 1 and FIG. 2.

FIG. 3A is a system diagram of network components which provide mapping functionality in the wireless communication devices of FIGS. 1 and 2. To achieve this, a mapping application is also provided in memory of the wireless communications device for rendering visual maps in its display. Wireless communications devices 202 are connected over a mobile carrier network 303 for communication through a firewall 305 to a relay 307. A request for map data from any one of the wireless communications devices 202 is received at relay 307 and passed via a secure channel 309 through firewall 311 to a corporate enterprise server 313 and corporate mobile data system (MDS) server 315. The request is then passed via firewall 317 to a public map server and/or to a public location-based service (LBS) server 321 which provides location-based services (LBS) to handle the request. The network may include a plurality of such map servers and/or LBS servers where requests are distributed and processed through a load distributing server. The map/LBS data may be stored on this network server 321 in a network database 322, or may be stored on a separate map server and/or LBS server (not shown). Private corporate data stored on corporate map/LBS server 325 may be added to the public data via corporate MDS server 315 on the secure return path to the wireless device 202. Alternatively, where no corporate servers are provided, the request from the wireless device 202 may be passed via relay 307 to a public MDS server 327, which sends the request to the public map/LBS server 321 providing map data or other local-based service in response to the request. For greater clarity, it should be understood that the wireless devices can obtain map data from a "pure" map server offering no location-based services, from an LBS server offering location-based services in addition to map content, or from a combination of servers offering map content and LBS.

A Maplet data structure is provided that contains all of the graphic and labelled content associated with a geographic area (e.g. map features such as restaurants (point features), streets (line features) or lakes (polygon features)). Maplets are structured in Layers of Data Entries ("DEntries") identified by a "Layer ID" to enable data from different sources to be deployed to the device and meshed for proper rendering. Each DEntry is representative of one or more artefact or label (or a combination of both) and includes coordinate information (also referred to as a "bounding box" or "bounding area") to identify the area covered by the DEntry and a plurality of data points that together represent the artefact, feature or label. For example, a DEntry may be used to represent a street on a city map (or a plurality of streets), wherein the carious points within the DEntry are separated into different parts representing various portions of the artefact or map feature (e.g. portions of the street). A wireless device may issue a request for the map server to download only those DEntries that are included within a specified area or bounding box representing an area of interest that can be represented by, for example, a pair of bottom left, top right coordinates.

Figure 3B:
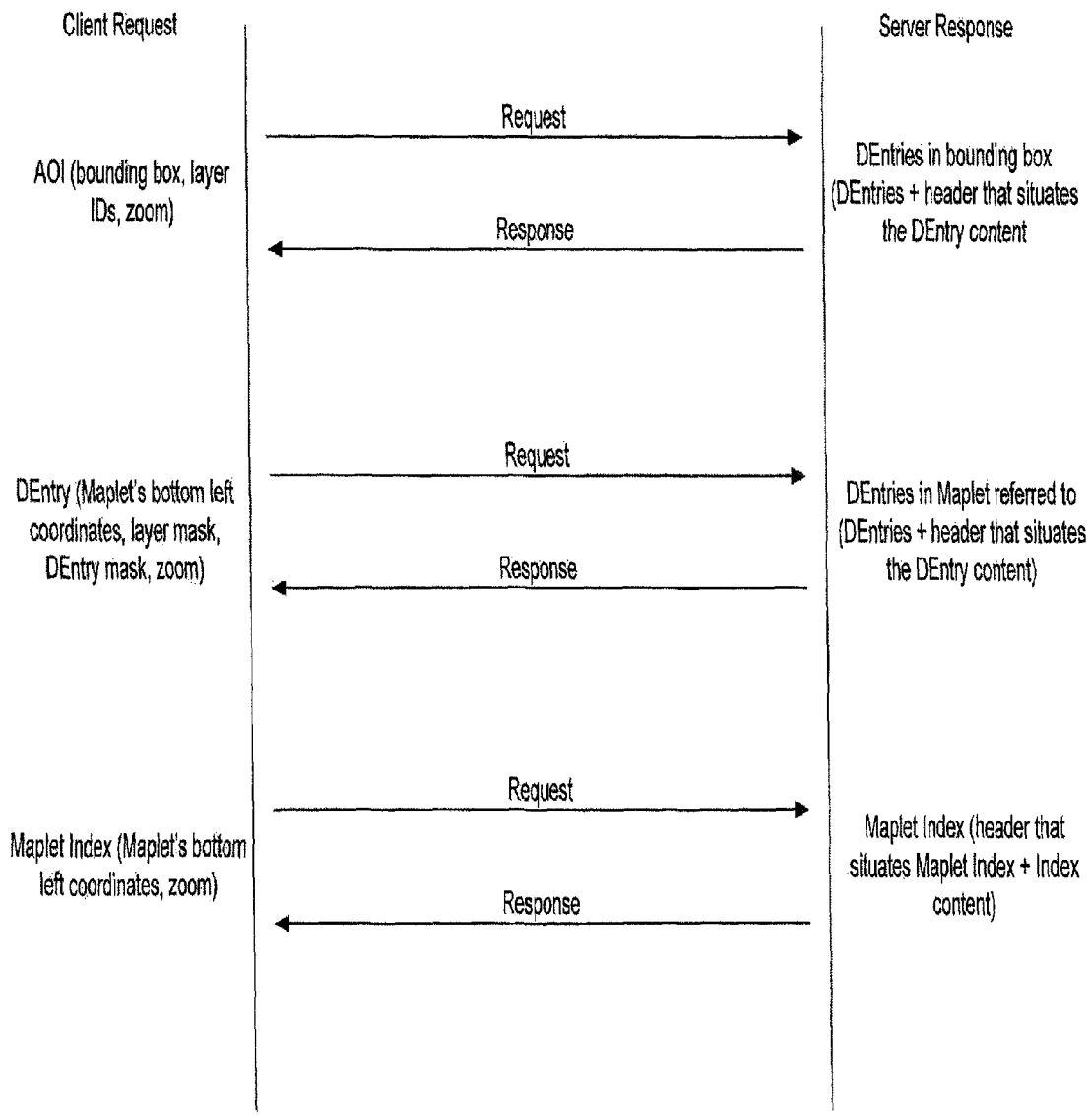
FIG. 3B illustrates a message exchange between a wireless communications device and a map server for downloading map content to the wireless communications device based on the system of FIG. 3A.

As depicted in FIG. 3B, the wireless communications device issues one or more AOI (Area of Interest) requests, DEntry or data requests and Maplet Index requests to the map server for selective downloading of map data based on user context. Thus, rather than transmitting the entire map data for an area in reply to each request from the device (which burdens the wireless link), local caching may be used in conjunction with context filtering of map data on the server. For example, if a user's wireless device is GPS enabled and the user is traveling in an automobile at 120 km/h along a freeway then context filtering can by employed to prevent downloading of map data relating to passing side streets. Or, if the user is traveling in an airplane at 30,000 feet, then context filtering can be employed to prevent downloading of map data for any streets whatsoever. Also, a user's context can be defined, for example, in terms of occupation, e.g. a user whose occupation is a transport truck driver can employ context filtering to prevent downloading of map data for side streets on which the user's truck is incapable of traveling, or a user whose occupation is to replenish supplied of soft drink dispensing machines can employ context filtering to download public map data showing the user's geographical area of responsibility with irrelevant features such as lakes and parks filtered out and private map data containing the location of soft drink dispensing machines superimposed on the public map data.

The Maplet Index request results in a Maplet Index (i.e. only a portion of the Maplet that provides a table of contents of the map data available within the Maplet rather than the entire Maplet) being downloaded from the map server to the device, thereby conserving OTA (Over-the-Air) bandwidth and device memory caching requirements. The Maplet Index conforms to the same data structure as a Maplet, but omits the data points. Consequently, the Maplet Index is small (e.g. 300-400 bytes) relative to the size of a fully populated Maplet or a conventional bit map, and includes DEntry bounding boxes and attributes (size, complexity, etc.) for all artefacts within the Maplet. As the field of view changes (e.g. for a location-aware device that displays a map while moving), the device (client) software assesses whether or not it needs to download additional data from the server. Thus, if the size attribute or complexity attribute of an artefact that has started to move into the field of view of the device (but is not yet being displayed) is not relevant to the viewer's current context, then the device can choose not to display that portion of the artifact. On the other hand, if the portion of the artefact is appropriate for display, then the device accesses its cache to determine whether the DEntries associated with that portion of the artefact have already been downloaded, in which case the cached content is displayed. Otherwise, the device issues a request for the map server to download all the of the DEntries associated with the artifact portion.

By organizing the Maplet data structure in Layers, it is possible to seamlessly combine and display information obtained from public and private databases. For example, it is possible for the device to display an office building at a certain address on a street (e.g. a $1^{st}$-order attribute from public database), adjacent a river (e.g. a $2^{nd}$ z-order attribute from public database), with a superimposed floor plane of the building to show individual offices (e.g. $11^{th}$ z-order attribute from a private database, accessible through a firewall).

Referring back to FIG. 3A, within the network having map server(s) and/or LBS server(s) 321 and database(s) 322 accessible to it, all of the map data for the entire world is divided and stored as a grid according to various levels of resolution (zoom), as set forth below in Table A. Thus, a single A-level Maplet represents a 0.05×0.05 degree grid area; a single B-level Maplet represents a 0.5×0.5 degree grid area; a single C-level Maplet represents a 5×5 degree grid area; a single D-level Maplet represents a 50×50 degree grid area; and a single E level Maplet represents the entire world in a single Maplet. It is understood that Table A is only an example of a particular Maplet grid division; different grid divisions having finer or coarser granularity may, of courser, be substituted. A Maplet includes a set of layers, with each layer containing a set of DEntries, and each DEntry containing a set of data points.

TABLE A

| Level | Grid (degrees) | # of Maplets to cover the World | # of Maplets to cover North America | # of Maplets to cover Europe |
|---|---|---|---|---|
| A | 0.05 × 0.05 | 25,920,000 | 356,000 | 100,000 |
| B | 0.5 × 0.5 | 259,200 | 6,500 | 1000 |
| C | 5 × 5 | 2,592 | 96 | 10 |
| D | 50 × 50 | 32 | 5 | 5 |
| E | World | 1 | 1 | 1 |

As mentioned above, three specific types of requests may be generated by a wireless communications device (i.e. the client)—AOI requests, DEntry requests and Maplet Index requests. The requests may be generated separately or in various combinations, as discussed in greater detail below. An AOI (area of interest) request calls for all DEntries in a given area (bounding box) for a predetermined or selected set of z-order Layers. The AOI request is usually generated when the device moves to a new area so as to fetch DEntries for display before the device client knows what is available in the Maplet. The Maplet Index has the exact same structure as a Maplet but does not contain complete DEntries (i.e. the data Points actually representing artifacts and labels are omitted). Thus, a Maplet Index defines what Layers and DEntries are available for a given Maplet. A data or DEntry request is a mechanism to bundle together all of the required Dentries for a given Maplet.

Typically, AOI and Maplet Index requests are paired together in the same message, although they need not be, while DEntry requests are generated most often. For example, when a wireless device moves into an area for which no information has been stored on the device client, the Maplet Index request returns a Maplet Index that indicates what data the client can specifically request from the server 321, while the AOI request returns any DEntries within the area of interest for the specified Layers (if they exist). In the example requests shown on FIG. 3B, the desired Maplet is identified within a DEntry request by specifying the bottom-left Maplet coordinate. In addition, the DEntry request may include a layer mask so that unwanted Layers are not downloaded, a DEntry mask so that unwanted data Points are not downloaded, and zoom values to specify a zoom level for the requested DEntry. Once the device client has received the requested Maplet Index, the client typically then issues multiple DEntry requests to ask for specific DEntries (since the client knows all of the specific DEntries that are available based on the Maplet Index).

In this particular implementation, a collection of 20×20 A-level Maplets (representing a 1×1 degree square) is compiled into a Maplet Block File (.mbl). An .mbl file contains a header which specifies the offset and length of each Maplet in the .mbl file. The same 20×20 collection of Maplet index data is compiled into a Maplet Index file (.mbx). The .mbl and .mbx file structures are set forth in Tables B and C, respectively.

TABLE B

| Address Offset | Offset | Length |
| --- | --- | --- |
| 0x000 | Maplet #0 Offset (4 bytes) | Maplet #0 Length (4 bytes) |
| 0x008 | Maplet #1 Offset | Maplet #1 Length |
| 0x010 | Maplet #2 Offset | Maplet #2 Length |
| ... | ... | ... |
| 0xC78 | Maplet #399 Offset | Maplet #399 Length |
| 0xC80 | | Beginning of Maplet #0 |
| 0xC80 + Size of Maplet #0 | | Beginning of Maplet #1 |
| 0xC80 + Size of Maplet #0 + #1 | | Beginning of Maplet #2 |
| ... | | ... |
| 0xC80 + Σ of Size of Maplets (#0: #398) | | Beginning of Maplet #399 |

In Table B, the offset of Maplet #0 is 0x0000_0000 since, in this particular example, the data structure is based on the assumption that the base address for the actual Maplet data is 0x0000_0C80. Therefore the absolute address for Maplet #0 data is: Maplet #0 Address=Base Address (0x0000_0C80)+ Maplet #0 Offset (0x0000_0000), and additional Maplet addresses are calculated as: Maplet #(n+1) Offset=Maplet #(n) Offset+Maplet #(n) Length. If a Maplet has no data or does not exist, the length parameter is set to zero (0x0000_0000).

TABLE C

| Address Offset | Offset (4 bytes) | Length (4 bytes) |
| --- | --- | --- |
| 0x000 | Maplet Index #0 Offset | Maplet Index #0 Length |
| 0x008 | Maplet Index #1 Offset | Maplet Index #1 Length |
| 0x010 | Maplet Index #2 Offset | Maplet Index #2 Length |
| ... | ... | ... |
| 0xC78 | Maplet Index #399 Offset | Maplet Index #399 Length |
| 0xC80 | | Beginning of Maplet Index #0 |
| 0xC80 + Size of Maplet Index #0 | | Beginning of Maplet Index #1 |
| 0xC80 + Size of Maplet Index #0 + #1 | | Beginning of Maplet Index #2 |
| ... | | ... |
| 0xC80 + Σ of Size of Maplet Indices (#0: #399) | | Beginning of Maplet Index #399 |

In Table C, the offset of Maplet Index #0 is 0x0000_0000 since, according to an exemplary embodiment the data structure is based on the assumption that the base address for the actual Maplet index data is 0x0000_0C80. Therefore, the absolute address for Maplet Index #0 data is: Maplet Index #0 Address=Base Address (0x0000_0C80)+Maplet Index #0 Offset (0x0000_0000), and additional Maplet index addresses are calculated as: Maplet Index #(n+1) Offset=Maplet Index #(n) Offset+Maplet Index #(n) Length. If a Maplet Index has no data or does not exist, the length parameter is set to zero (0x0000_0000).

Figure 3C:
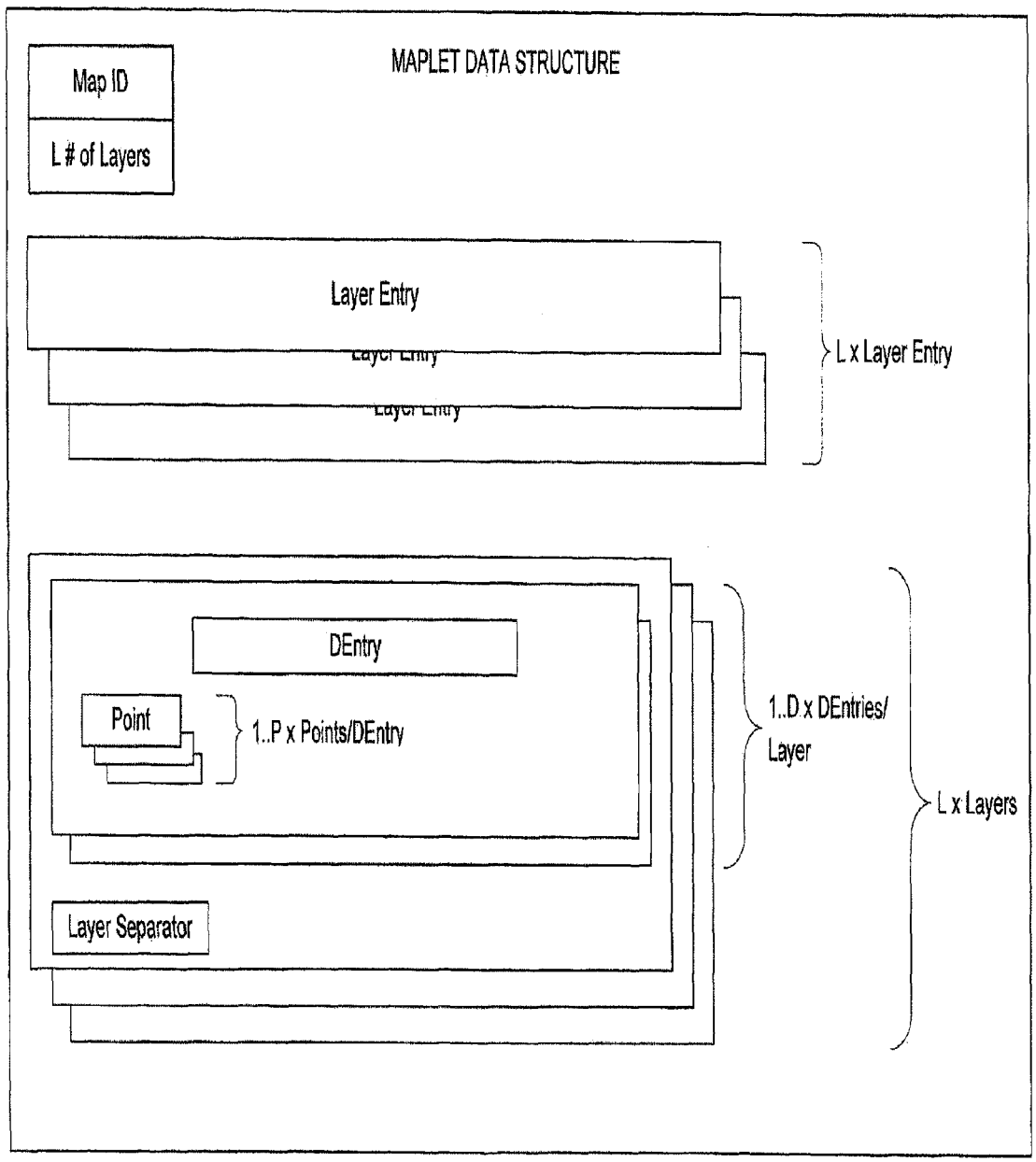
FIG. 3C is a diagram showing a preferred Maplet data structure.

FIG. 3C and Table D (below), in combination, illustrate, by way of example only, a basic Maplet data structure. Generally, as noted above, the Maplet data structure can be said to include a Maplet Index (i.e. an index of the DEntries, each of which is representative of either an artifact or a label or both) together with data Points for each DEntry that actually form such artifacts and labels. In this example, each Maplet includes a Map ID (e.g. 0xA1B1C1D1), the # of Layers in the Maplet, and a Layer Entry for each Layer. The Map ID identifies the data as a valid Maplet, and according to one alternative, may also be used to identify a version number for the data. The # of Layers is an integer which indicates the number of Layers (and therefore Layer Entries) in the Maplet. Each Layer Entry defines rendering attributes and is followed by a list of DEntries for each Layer. The above forms a Maplet Index. For a complete Maplet, each DEntry contains a set of data Points (referred to herein as oPoints) or Labels). It will be noted that Layers can have multiple DEntries and the complete list of DEntries and Points are grouped by Layer and separated by a Layer Separator (e.g. hex value 0xEEEEEEEE) In this example, each Layer Entry is 20 bytes long, and a DEntry is 12 bytes long. However, the number of Layers, number of DEntries per Layer and the number of Points per DEntry depends on the map data and is generally variable.

Table D provides a high "byte-level" description of a Maplet for this example.

TABLE D

| Data | Quantity | Total # of Bytes |
| --- | --- | --- |
| Map ID | 1 | 4 bytes |
| # of Layers | 1 | 4 bytes |
| Layer Entries | # of Layers | 20 bytes x (# of Layers) |
| DEntry of a Layer | x (# of DEntries in a Layer) | 12 bytes x (Σ of the # of DEntries in each Layer) + |
| Points for DEntry of a Layer | # of Layers | 4 bytes x (Σ of the # of Points in each DEntry in each Layer) + |
| Layer Separator | | 4 bytes x (# of Layers) |

By way of a further example, the wireless network 200 depicted in FIG. 4 can include an applications gateway (AG) 350 for optimizing data flow for onboard applications such as a mapping application 500 stored in memory (e.g. stored in a flash memory 224) and executable by the microprocessor 238 of the wireless device 202.

As shown in FIG. 4, the wireless network 200 hosts a plurality of handheld wireless communications devices 202 (such as the BlackBerry® by Research in Motion Limited) having voice and data capabilities (for both e-mail and web browsing) as well as a full QWERTY keyboard. These wireless communications devices 202 can access Web-based map data on public map servers 400 hosted on the Internet or other data network 130 via the applications gateway (AG) 350 which mediates and optimizes data flow between the wireless network 200 and the data network by performing various mappings, compressions and optimizations on the data.

The map server extracts generic map content from a Geographical Information Systems (GIS) map database (e.g. Navtech®, TelAtlas®., etc.) at a specified level of resolution (zoom level). Custom graphics associated with the query, such as highlighted route, pushpin for current position or street address, etc. are post-processed and merged by the server with the generic map content. Relevant screen graphics are then labelled, and the merged map graphic is compressed and delivered to the device for display.

In operation, a user of the wireless communications device 202 uses an input device such as keyboard 232 and/or thumbwheel/trackball 233 to cause the microprocessor 238 to open the map application 500 stored in the memory 224. Using the keyboard 232 and thumbwheel/trackball 233, the user specifies a map location on the map application 500. In response to this request/command, the microprocessor 238 instructs the RF transceiver circuitry 211 to transmit the request over the air through the wireless network 104. The request is processed by the AG 350 and forwarded into the data network (Internet) using standard packet-forwarding protocols to one or more of the public and/or private map servers 400, 410. Accessing a private map server 410 behind a corporate firewall 420 was described above with reference to FIG. 3A. Map data downloaded from these one or more map servers 400, 41 is then forwarded in data packets through the data network and mapped/optimized by the AG 350 for wireless transmission through the wireless network 104 to the wireless communications device 202 that originally sent the request.

The downloaded map data can be cached locally in RAM 226, and displayed on the display 222 or graphical user interface (GUI) of the device after a suitable spherical correction factor has been applied to the obtained map data by the map application 500. If a further request is made by the user (or if the user wants a change in the field of view by zooming or panning), the device will check whether the data required can be obtained from the local cache (RAM 226). If not, the device issues a new request to the one or more map servers 400, 410 in the same manner as described above.

As described earlier, map data can optionally be downloaded first as a Maplet Index enabling the user to then choose which DEntries listed in the Index to download in full. Furthermore, as described earlier, the map application can include user-configurable context filtering that enables the user to filter out unwanted map features or artifacts by not downloading specific DEntries corresponding to those unwanted map features or artifacts.

As a variant, the wireless communications device can optionally include a Global Positioning System (GPS) receiver ("GPS chip") 550 for providing location-based services (LBS) to the user in addition to map content. Embedding a GPS chip 550 capable of receiving and processing signals from GPS satellites enable the GPS chip to generate latitude and longitude coordinates, thus making the device "location aware". To obtain local-based services, the map application within the wireless communications device sends a request to the map server for information relating to a city, restaurant, street address, route, etc. If the device is "location aware", the request would include the current location of the device.

In lieu of, or in addition to, GPS coordinates, the location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell.

Figure 5:
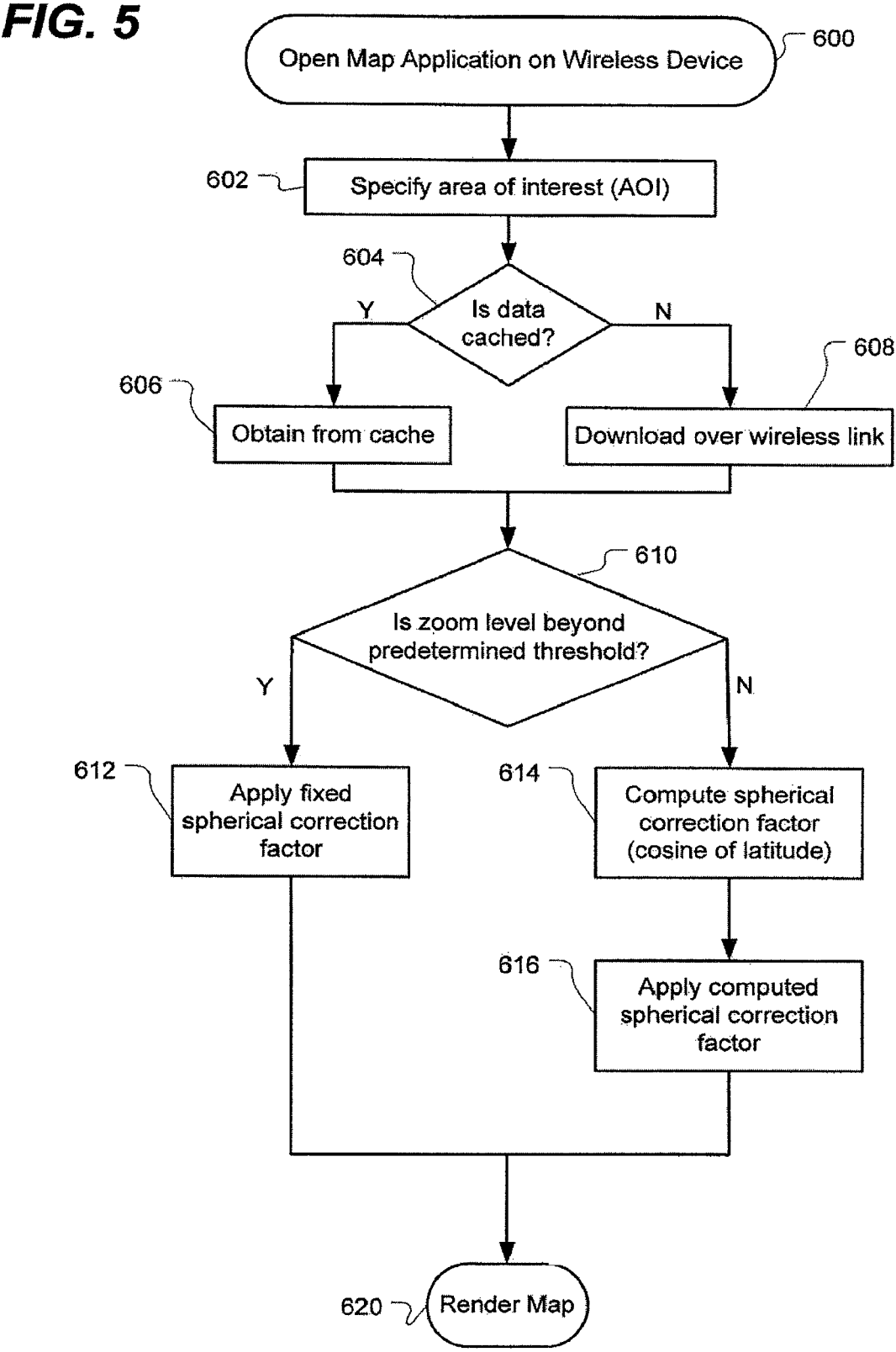
FIG. 5 is a flowchart presenting steps of a method of displaying a map on a wireless device.
Figure 6:
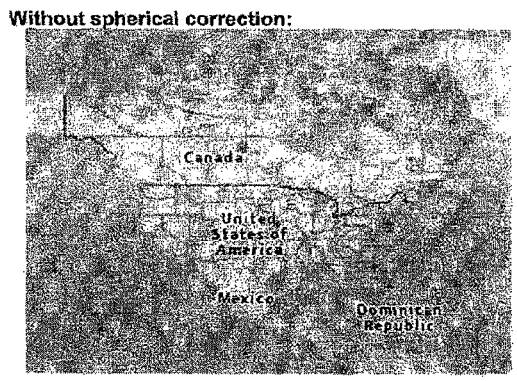
FIG. 6 is a screenshot of a map of North America without spherical correction.
Figure 7:
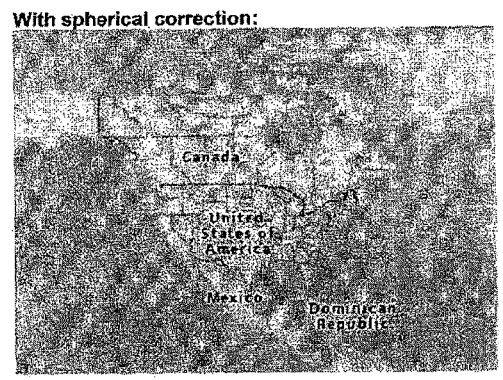
FIG. 7 is a screenshot of the same map of North America after applying spherical correction.
Figure 8:
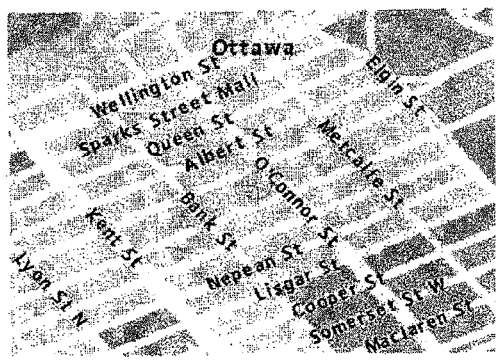
FIG. 8 is a screenshot of a street map of downtown Ottawa, Canada (latitude 45° 19' N) without spherical correction.
Figure 9:
FIG. 9 is a screenshot of the same street map of downtown Ottawa, Canada after applying spherical correction.

Operation of the systems described above will now be described with reference to the method steps depicted in the flowchart of FIG. 5. As depicted in FIG. 5, this method of displaying a map on a wireless communications device includes initial steps of opening the map application on the device (step 600) and specifying an area of interest (AOI) using the map application (step 602), e.g. specifying a street address, coordinates of latitude or longitude, or clicking on a location on a world map, etc. In response to the specifying of an AOI, map data is then obtained (step 604) for rendering the map to be displayed on the wireless communications device. For the purposes of this specification, "obtaining map data" means receiving or downloading the map data over the air, i.e. over a wireless link, retrieving the map data from a local cache, or downloading the map data over a wired connection, or any combination thereof In other words, as depicted in FIG. 5, obtaining map data includes steps of determining whether the data is already cached locally (step 604). If the data is locally cached, the map data is retrieved from the cache (step 606). Otherwise, if not all of the map data is cached, then the map data is downloaded over the air (step 608).

As depicted in FIG. 5, once the map data is obtained, the device checks (step 610) whether the zoom level exceeds a predetermined threshold. If so, then a fixed spherical correction factor is applied (step 612) to the obtained map data to generate the corrected map data. If not, then the spherical correction factor is computed (step 614) based on the latitude of the center of the visible portion of the map, rather than being based on the latitude of each one of the vertices. For zoom levels less than the predetermined threshold, the spherical correction factor is computed as the cosine of the absolute value of the latitude of the center of the visible portion of the map. The computed spherical correction factor is then applied to the obtained map data to generate the corrected map data (step 616). After the step of generating the corrected map data by applying the spherical correction factor to the obtained map data, the corrected map data is rendered in order to display the map on the display of the wireless communications device (step 620). This spherical correction factor corrects for the map distortions that inherently occur at northerly or southerly latitudes when cylindrical projection maps are displayed. This correction is accomplished in real-time without the need for computationally intensive algorithms that would be unsuitable for wireless devices. In other words, since the spherical correction factor is computationally straightforward, real-time distortion-correction can be achieved on a wireless device without unduly burdening the limited resources of the device's onboard processor.

When computing the spherical correction factor, it is preferable to calculate a single spherical correction factor for applying to all of the vertices of the map to be rendered based on a latitude of a center of the map. In other words, it is preferably that the spherical correction factor be equal to a cosine of an absolute value of the latitude of the center of the map. Preferably, the step of generating the corrected map data entails incorporating the spherical correction factor into a 3×3 transformation matrix that transforms all vertices in the map to be rendered from latitude and longitude coordinates into screen coordinates. This matrix can be used by the native-level OS code for fast transformations of every one of the vertices in the scene. Algorithms for performing standard matrix transformations are well known in the art. As an example, one matrix transformation that can be applied to generate corrected map data (X,Y coordinates) would be:

$$\begin{bmatrix} Xcorrected \\ Ycorrected \\ 1 \end{bmatrix} = \begin{bmatrix} a\cos(\text{Lat}) & c\cos(\text{Lat}) & e\cos(\text{Lat}) \\ b\cos(\text{Lat}) & d\cos(\text{Lat}) & f\cos(\text{Lat}) \\ 0 & 0 & 1 \end{bmatrix} \cdot \begin{bmatrix} X \\ Y \\ 1 \end{bmatrix}$$

In this equation, it is implicit that cos(Lat) means the cosine of the absolute value of the latitude expressed in degrees (where minutes and seconds are converted into decimals of degrees).

As noted above, generating the corrected map data can optionally entail using a fixed latitude to calculate the spherical correction factor when a selected zoom level of the map exceeds a predetermined zoom level. This compensates for what would otherwise be a noticeable change in the amount of horizontal compression as the user pans up and down at certain zoom levels, which is not aesthetically pleasing to the user. In a preferred implementation, the fixed latitude is 41 degrees, thus providing an approximate correction for large-scale views. This approximate correction can be used for both the northern and southern hemispheres beyond the predetermined zoom level. Of course, this latitude is only a preferred implementation for a specific threshold and therefore it should be expressly understood that other fixed latitudes can be utilized to obtain good results for different thresholds. A tiered approach could also be used whereby two or more thresholds are provided (each with its own fixed latitude) for approximate corrections at respective zoom levels.

The effect of the foregoing spherical correction techniques is to make the scale the same in both the vertical and horizontal directions. While Mercator achieves this result by stretching the vertices vertically, the present technique compresses the vertices horizontally. This technology is more computationally efficient because the spherical correction entails applying the 3×3 transformation matrix by utilizing the latitude of the center of the visible portion of the map (the scene center) rather than utilizing the latitude of each of the vertices individually.

Although the preferred technique is to calculate a single spherical correction factor based on the latitude of the center of the map, as described above, it would also be possible (although computationally not as efficient) to generate more than one spherical correction factor. For example, a first spherical correction factor could be used for transforming the vertices of the top half of the visible map whereas a second (different) spherical correction factor could be used for transforming the vertices of the bottom half of the visible map. In other words, instead of transforming the entire set of vertices for the visible map, latitude values for a subset of these vertices are used. However, the computational effort increases with the size of the subset.

The foregoing method steps can be implemented as coded instructions in a computer program product. In other words, the computer program product is a computer-readable medium upon which software code is recorded to perform the foregoing steps when the computer program product is loaded into memory and executed on the microprocessor of the wireless communications device.

This new technology has been described in terms of specific implementations and configurations which are intended to be exemplary only. The scope of the exclusive right sought by the Applicant is therefore intended to be limited solely by the appended claims.

What is claimed is:

1. A method of displaying a map on a wireless communications device, the method comprising:
    obtaining map data for rendering the map to be displayed on the wireless communications device;
    when a selected zoom level of the map exceeds a predetermined zoom level, generating corrected map data by applying a first spherical correction factor to a first portion of the obtained map data by using a first fixed latitude to calculate the first spherical correction factor and by applying a second spherical correction factor to a second portion of the obtained map data by using a second fixed latitude to calculate the second spherical correction factor; and
    rendering the corrected map data to display the map on a display of the wireless communications device.

2. The method as claimed in claim 1 wherein the first spherical correction factor is equal to a cosine of an absolute value of the first fixed latitude and wherein the second spherical correction factor is equal to a cosine of an absolute value of the second fixed latitude.

3. The method as claimed in claim 1 wherein generating the corrected map data comprises incorporating the first spherical correction factor into a 3×3 transformation matrix that transforms vertices in the first portion of the map from latitude and longitude coordinates into screen coordinates and wherein generating the corrected map data comprises a step of incorporating the second spherical correction factor into a 3×3 transformation matrix that transforms vertices in the second portion of the map from latitude and longitude coordinates into screen coordinates.

4. The method as claimed in claim 2 wherein generating the corrected map data comprises incorporating the first spherical correction factor into a 3×3 transformation matrix that transforms vertices in the first portion of the map from latitude and longitude coordinates into screen coordinates and wherein generating the corrected map data comprises a step of incorporating the second spherical correction factor into a 3×3 transformation matrix that transforms vertices in the second portion of the map from latitude and longitude coordinates into screen coordinates.

5. The method as claimed in claim 1 wherein the first or second fixed latitude is determined based on the current location of the wireless communications device.

6. A computer-readable medium comprising code which when loaded into memory and executed by a processor of a wireless communications device is adapted to:
   obtain map data for rendering the map to be displayed on the wireless communications device;
      when a selected zoom level of the map exceeds a predetermined zoom level, generate corrected map data by applying a first spherical correction factor to a first portion of the obtained map data by using a first fixed latitude to calculate the first spherical correction factor and by applying a second spherical correction factor to a second portion of the obtained map data by using a second fixed latitude to calculate the second spherical correction factor; and
      render the corrected map data to display the map on a display of the wireless communications device.

7. The computer-readable medium as claimed in claim 6 comprising code for calculating the first spherical correction factor using a cosine of an absolute value of the first fixed latitude and for calculating the second spherical correction factor using a cosine of an absolute value of the second fixed latitude.

8. The computer-readable medium as claimed in claim 6 comprising code adapted to incorporate the first spherical correction factor into a 3×3 transformation matrix that transforms vertices in the first portion of the map from latitude and longitude coordinates into screen coordinates and incorporate the second spherical correction factor into a 3×3 transformation matrix that transforms vertices in the second portion of the map from latitude and longitude coordinates into screen coordinates.

9. The computer-readable medium as claimed in claim 7 comprising code adapted to incorporate the first spherical correction factor into a 3×3 transformation matrix that transforms vertices in the first portion of the map from latitude and longitude coordinates into screen coordinates and incorporate the second spherical correction factor into a 3×3 transformation matrix that transforms vertices in the second portion of the map from latitude and longitude coordinates into screen coordinates.

10. A wireless communications device for enabling a user of the device to display a map
   on the device, the wireless device comprising:
      an input device for enabling the user to cause the device to obtain map data for rendering the map to be displayed on a display of the device; and
      a processor for generating corrected map data by applying a first spherical correction factor to a first portion of the obtained map data by using a first fixed latitude to calculate the first spherical correction factor and by applying a second spherical correction factor to a second portion of the obtained map data by using a second fixed latitude to calculate the second spherical correction factor when a selected zoom level of the map exceeds a predetermined zoom level; and
      a display for displaying the corrected map data for the map.

11. The wireless communications device as claimed in claim 10 wherein the first spherical correction factor is equal to a cosine of an absolute value of the first fixed latitude and wherein the second spherical correction factor is equal to a cosine of an absolute value of the second fixed latitude.

12. The wireless communications device as claimed in claim 10 wherein the processor incorporates the first spherical correction factor into a 3×3 transformation matrix that transforms all vertices of the first portion of the map from latitude and longitude coordinates into screen coordinates and wherein the processor incorporates the second spherical correction factor into a 3×3 transformation matrix that transforms all vertices of the second portion of the map from latitude and longitude coordinates into screen coordinates.

13. The wireless communications device as claimed in claim 11 wherein the processor incorporates the first spherical correction factor into a 3×3 transformation matrix that transforms all vertices of the first portion of the map from latitude and longitude coordinates into screen coordinates and wherein the processor incorporates the second spherical correction factor into a 3×3 transformation matrix that transforms all vertices of the second portion of the map from latitude and longitude coordinates into screen coordinates.

14. The wireless communications device as claimed in claim 10 further comprising a
   Global Positioning System (GPS) receiver for generating GPS position data for a current location of the device and for communicating the position data to the processor for computing one of the first and second spherical correction factors based on the latitude of the current location of the device.

* * * * *